United States Patent
Jansen

(10) Patent No.: US 10,227,198 B1
(45) Date of Patent: Mar. 12, 2019

(54) DEVICE FOR PRODUCING BOTH LINERLESS LABELS AND LINED LABELS

(71) Applicant: Maan Intellectual Properties B.V., Raalte (NL)

(72) Inventor: Sjoerd Maria Jansen, Raalte (NL)

(73) Assignee: Maan Intellectual Properties B.V., Raalte (NL)

( * ) Notice: Subject to any disclaimer, the term of this patent is extended or adjusted under 35 U.S.C. 154(b) by 0 days.

(21) Appl. No.: 15/918,335

(22) Filed: Mar. 12, 2018

(51) Int. Cl.
| | |
|---|---|
| *B65H 23/188* | (2006.01) |
| *G09F 3/02* | (2006.01) |
| *B05C 13/02* | (2006.01) |
| *C09J 7/40* | (2018.01) |
| *B05C 9/12* | (2006.01) |
| *C09J 7/30* | (2018.01) |
| *B65H 20/02* | (2006.01) |

(52) U.S. Cl.
CPC ............ *B65H 23/188* (2013.01); *B05C 9/12* (2013.01); *B05C 13/02* (2013.01); *B65H 20/02* (2013.01); *C09J 7/30* (2018.01); *C09J 7/401* (2018.01); *G09F 3/02* (2013.01); *B65H 2701/192* (2013.01); *C09J 2201/61* (2013.01); *C09J 2203/334* (2013.01); *C09J 2483/005* (2013.01); *G09F 2003/0225* (2013.01)

(58) Field of Classification Search
USPC ................................................ 156/578, 582
See application file for complete search history.

(56) References Cited

U.S. PATENT DOCUMENTS

| | | | | |
|---|---|---|---|---|
| 4,279,687 A | * | 7/1981 | Buchholz | B65C 9/2291 118/231 |
| 4,292,104 A | * | 9/1981 | Heimbach | B41M 3/12 101/153 |
| 4,351,679 A | * | 9/1982 | Dreher | B65B 61/202 156/70 |
| 4,561,921 A | * | 12/1985 | Treiber | B65C 9/1884 156/277 |
| 4,724,029 A | * | 2/1988 | Kontz | B65C 3/16 156/256 |
| 4,743,469 A | * | 5/1988 | Lehmann | B65C 9/22 427/208.2 |
| 4,761,200 A | * | 8/1988 | Szeremeta | B65C 9/1819 118/231 |

(Continued)

FOREIGN PATENT DOCUMENTS

JP        56004675 A   *   1/1981

OTHER PUBLICATIONS

English Abstract of JP 56-004675 (Year: 2018).*

*Primary Examiner* — Sing P Chan
(74) *Attorney, Agent, or Firm* — The Webb Law Firm

(57) ABSTRACT

A device for producing both linerless labels and lined labels includes a base frame; a hotmelt station arranged on the base frame; and a portal frame arranged on the base frame and extending over the hotmelt station. A number of guide rollers are arranged on the portal frame for guiding a web of material along a web path. The hotmelt station is rotatably arranged on the base frame around an axis parallel to the plane of the web path of the guide rollers between a first position and a reversed, second position. Both the first and second position the plane of the web path of the hotmelt station are parallel to the plane of the web path of the guide rollers on the portal frame.

8 Claims, 3 Drawing Sheets

(56) References Cited

U.S. PATENT DOCUMENTS

| | | | | |
|---|---|---|---|---|
| 4,781,785 A * | 11/1988 | Szeremeta | | B65C 9/2265 |
| | | | | 118/231 |
| 5,082,520 A * | 1/1992 | West | | B65C 3/16 |
| | | | | 156/450 |
| 5,435,862 A * | 7/1995 | Williams | | B65C 1/021 |
| | | | | 156/277 |
| 5,540,795 A * | 7/1996 | Franklin | | B65C 1/021 |
| | | | | 156/350 |
| 5,832,178 A * | 11/1998 | Schave | | B05C 11/1042 |
| | | | | 392/472 |
| 5,865,918 A * | 2/1999 | Franklin | | B65C 9/1826 |
| | | | | 156/363 |
| 5,974,227 A * | 10/1999 | Schave | | B05C 11/1042 |
| | | | | 392/472 |
| 6,049,658 A * | 4/2000 | Schave | | B05C 11/1042 |
| | | | | 219/426 |
| 6,491,080 B2 * | 12/2002 | Tasma | | B65C 9/1807 |
| | | | | 156/387 |
| 6,526,725 B1 * | 3/2003 | Williams | | B65B 61/205 |
| | | | | 493/379 |
| 6,616,763 B2 * | 9/2003 | Spatafora | | B65B 51/023 |
| | | | | 118/302 |
| 6,699,323 B2 * | 3/2004 | Tacchi | | B05B 15/70 |
| | | | | 118/302 |
| 8,006,734 B2 * | 8/2011 | Hajny | | B65H 37/005 |
| | | | | 156/538 |
| 8,846,833 B2 * | 9/2014 | Prenzel | | C09J 141/00 |
| | | | | 526/220 |
| 9,186,695 B2 * | 11/2015 | Otruba | | B05C 5/0208 |
| 9,314,812 B2 * | 4/2016 | Clark | | B05C 5/0225 |
| 9,789,645 B2 * | 10/2017 | Otruba | | B29C 65/525 |
| 10,029,411 B2 * | 7/2018 | Otruba | | B29C 65/525 |
| 2001/0027845 A1 * | 10/2001 | Tasma | | B65C 9/1807 |
| | | | | 156/499 |
| 2002/0040677 A1 * | 4/2002 | Spatafora | | B65B 51/023 |
| | | | | 118/302 |
| 2002/0108562 A1 * | 8/2002 | Tacchi | | B05B 15/70 |
| | | | | 118/75 |
| 2003/0047275 A1 * | 3/2003 | Tasma | | B65C 9/1807 |
| | | | | 156/264 |
| 2005/0126692 A1 * | 6/2005 | Hajny | | B65H 37/002 |
| | | | | 156/238 |
| 2005/0178507 A1 * | 8/2005 | Hajny | | B65H 37/005 |
| | | | | 156/538 |
| 2006/0040085 A1 * | 2/2006 | Downs | | B65H 37/005 |
| | | | | 428/42.3 |
| 2010/0249697 A1 * | 9/2010 | Matusch | | A61J 1/2096 |
| | | | | 604/68 |
| 2011/0196342 A1 * | 8/2011 | Matusch | | A61J 1/2096 |
| | | | | 604/518 |
| 2013/0017329 A1 * | 1/2013 | Lasko | | B05C 1/10 |
| | | | | 427/256 |
| 2017/0183547 A1 * | 6/2017 | Bamberg | | C08F 220/18 |
| 2017/0210061 A1 * | 7/2017 | Otruba | | B29C 65/525 |
| 2018/0036960 A1 * | 2/2018 | Otruba | | B29C 65/525 |

* cited by examiner

DEVICE FOR PRODUCING BOTH LINERLESS LABELS AND LINED LABELS

BACKGROUND OF THE INVENTION

Field of the Invention

The invention relates to a device for producing both linerless labels and lined labels, which device comprises:
- a base frame;
- a hotmelt station arranged on the base frame, which hotmelt station comprises a first back-up roller, a hotmelt applicator directed towards the first back-up roller for applying a coating of hotmelt on a web of material guided over the first backup-roller and downstream of the hotmelt applicator, a second back-up roller and a pressure roller urged against the second back-up roller, wherein a web path extends from near the bottom of the hotmelt station upwards through the first nip formed by the first back-up roller and the hotmelt applicator and over the second back-up roller and through the second nip formed by the second back-up roller and the pressure roller ending on a first side of the hotmelt station.

Description of Related Art

In the production of labels it is known to provide, in a production line, a supply of label material in the form of a web. This label material is typically printed on at least one side. The printing of the label material can be done in the same production line or off-line, such that the web of label material is supplied from a roll.

To provide the typical adhesive layer to the label material, the web of label material is fed to a hotmelt station wherein a coating of hotmelt is arranged on the web of label material, typically on the side opposite of the printed side.

The web of label material provided with the hotmelt coating is typically not directly used in the same production line, such that the web of label material needs to be rolled up again. However, the hotmelt coating would stick to the printed side if no additional measures would be taken. Accordingly it is known to either have so-called linerless labels and lined labels.

With linerless labels the printed side of the web of label material is provided with a release layer, such as a silicone coating which allows the hotmelt coating to easily peel of when the web of layer material is rolled up. The silicone coating is typically applied before the web of label material is fed to the hotmelt station. The silicone coating is typically provided by a separate station arranged in the same production line.

With lined labels a separate web of liner material is provided. The web of liner material is merged with the web of label material, after it has been coated with hotmelt, such that the liner material covers the hotmelt coating.

A typical production line is either suitable for linerless labels or for lined labels, but not for both. This is because with linerless labels the bottom side (viewed when it is supplied to the device for producing the label) of the web of label material is to be coated with hotmelt, while for lined labels the top side of the web of label material is to be coated with hotmelt.

Accordingly it is an object of the invention to reduce or even remove the above mentioned disadvantages.

SUMMARY OF THE INVENTION

This object is achieved according to the invention with a device as described herein, which device is characterized by a portal frame arranged on the base frame and extending over the hotmelt station, wherein a number of guide rollers are arranged on the portal frame for guiding a web of material along a web path, which web path extends at least over the hotmelt station;

wherein the hotmelt station is rotatable arranged on the base frame around an axis parallel to the plane of the web path of the guide rollers between a first position and a reversed, second position, in which both the first and second position the plane of the web path of the hotmelt station is parallel to the plane of the web path of the guide rollers on the portal frame.

By having the hotmelt station rotatable, in particular over 180°, the web of label material supplied to the hotmelt station could be provided on either side with a hotmelt coating. As the hotmelt station is rotated between two positions, the first side of the hotmelt station will also be positioned on two opposite sides. To ensure that the web of material coated with hotmelt still arrives at a desired end of the device, the portal frame is provided such that the web of material coated with hotmelt can be guided from one end over the hotmelt station to the other end.

In a preferred embodiment of the device according to the invention, in the first position of the hotmelt station, a single continuous web path is created by the web path of the hot melt station continued by the web path of the guide rollers and wherein in the reversed, second position the web path of the guide rollers ends into the second nip of hotmelt station, such that a web of material guided along the web path of the guide rollers is merged with a web of material guided along the web path of the hotmelt station.

In the first embodiment, the device is suitable to be used for linerless labels, wherein only a single web of label material needs to be fed to the device. In the second embodiment, the web of label material is fed from the same position into the device according to the invention, but because the hotmelt station is rotated, the web of label material will be provided with a hotmelt coating on the opposite side. Furthermore, a web of liner material can be fed via the rollers on the portal frame, such that the web of liner material can be merged with the hotmelt coated label material, such that a lined label is produced.

A further embodiment of the device according to the invention comprises further a first web alignment arranged on the portal frame and on the end of the web path of the guide rollers.

This first web alignment can be used to control the alignment of the web of material exiting the hotmelt station and which web is fed directly to the web alignment or is fed via the web path of the portal frame.

Yet another further embodiment of the device according to the invention comprises a second web alignment arranged on the portal frame along the web path of the guide rollers and upstream of the first web alignment.

The second web alignment can be used in case a separate web of liner material is to be merged with a hotmelt coated web of label material. The second web alignment ensures that the liner material is aligned and arranged on the label material preventing the combined lined label material from curling after leaving the device according to the invention.

The invention also relates to a combination of a device according to the invention and a web of label material, which is on one side provided with a release layer, such as a silicone coating, wherein the hotmelt station is rotated into the first position and wherein the web of label material is transported from near the bottom of the hotmelt station upwards through the first nip and over the second back-up roller and through the second nip, wherein the release layer is in direct contact with both the first and second back-up rollers, and wherein the web of label material exits on the first side of the hotmelt station, continues along the web path of the portal frame, such that the web of label material is transported over the hotmelt station to the second side of the hotmelt station opposite from the first side.

This combination is typically suitable for producing linerless labels.

The invention furthermore relates to a combination of a device according to the invention, a web of label material, and a web of liner material which is on one side provided with a release layer, wherein the hotmelt station is rotated into the second position and wherein the web of label material is transported from near the bottom of the hotmelt station upwards through the first nip and over the second back-up roller and through the second nip, wherein the web of label material exits on the first side of the hotmelt station, and wherein the web of liner material is transported via the web path of the portal frame from the second side of the hotmelt station, being opposite from the first side, to the first side of the hotmelt station, wherein the web of liner material is fed into the second nip of hotmelt station, such that the web of liner material is merged with the web of label material and wherein the release layer of the web of liner material is in direct contact with the applied coating of hotmelt.

This combination is typically suitable for producing lined labels, wherein the same device according to the invention is used as with the combination for producing linerless labels. The only change to the device is that the device is rotated from the first position to the second position.

The invention also relates to a combination of a device according to the invention, a web of label material, and a web of liner material which is on one side provided with a release layer, such as a silicone coating, wherein the hotmelt station is rotated into the second position and wherein the web of liner material is transported from near the bottom of the hotmelt station upwards through the first nip, such that the release layer is coated with a hotmelt, and over the second back-up roller and through the second nip, wherein the web of liner material exits on the first side of the hotmelt station, and wherein the web of label material is transported via the web path of the portal frame from the second side of the hotmelt station, being opposite from the first side, to the first side of the hotmelt station, wherein the web of label material is fed into the second nip of hotmelt station, such that the web of label material is merged with the web of liner material and wherein the coating of hotmelt of the web of liner material is in direct contact with the web of label material.

This alternative combination is suitable depending on the orientation of the print on the web of label material.

BRIEF DESCRIPTION OF THE DRAWINGS

These and other features of the invention will be elucidated in conjunction with the accompanying drawings.

DESCRIPTION OF THE INVENTION

Figure 1:
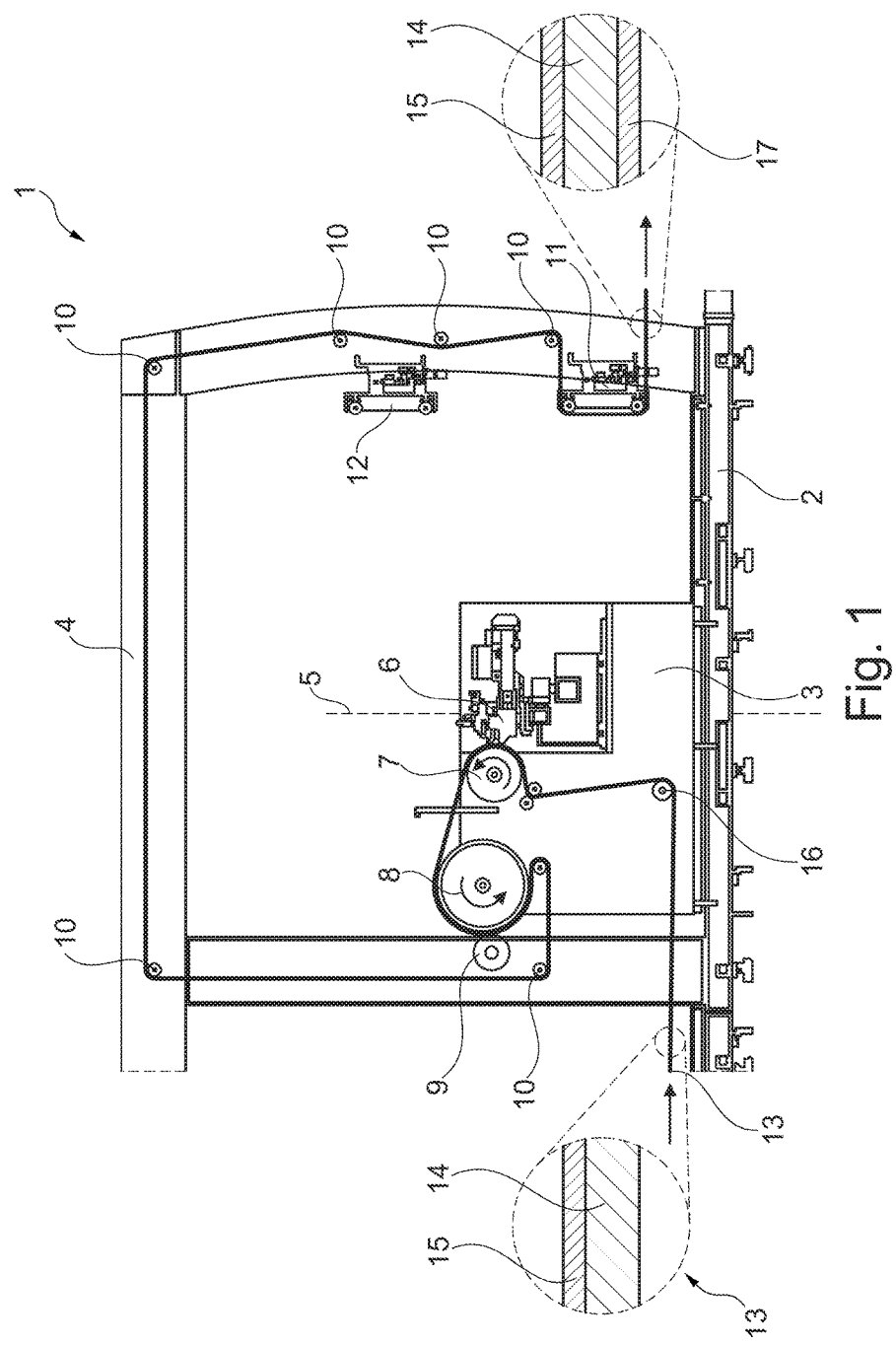
FIG. 1 shows an embodiment of a device according to the invention with the hotmelt station in the first position.

FIG. 1 shows a device 1 according to the invention. The device 1 has a base frame 2 on which a hotmelt station 3 and a portal frame 4 is arranged.

The hotmelt station 3 is rotatable around an axis 5 and shown in the first position. The hotmelt station 3 comprises furthermore a hotmelt applicator 6, which is directed towards a first back-up roller 7, and a second back-up roller 8 with a pressure roller 9 urged against the second back-up roller 8.

The portal frame 4 is provided with a plurality of rollers 10, which provide a web path for a web of material, and with a first web alignment 11 and a second web alignment 12.

In the shown position of the device 1, a web of label material 13 is fed to the device 1. The web of label material 13 has a substrate 14 with on the top side a silicone coating 15. The label material 13 runs along a reversing roller 16, such that the web of material 13 is transported from the bottom of the hotmelt station 3 upwards into the first nip provided by the back-up roller 7 and applicator 6, where the applicator 6 applies a coating of hotmelt to the bottom of the substrate 14 of the web 13. The web 13 is then further transported through the second nip provided by the back-up roller 8 and pressure roller 9.

The web of label material 13 leaves the hotmelt station 3 on a first side and is guided along the rollers 10 of the web path of the portal frame 4 to the first web alignment 11.

After the web alignment 11, the web of label material 13 leaves the device 1. The web of label material 13 has upon exiting the device 1, a substrate layer 14, the silicone layer 15 arranged on the top and a hotmelt layer 17 arranged to the bottom of the substrate layer 14, such that a linerless label is provided.

Figure 2:
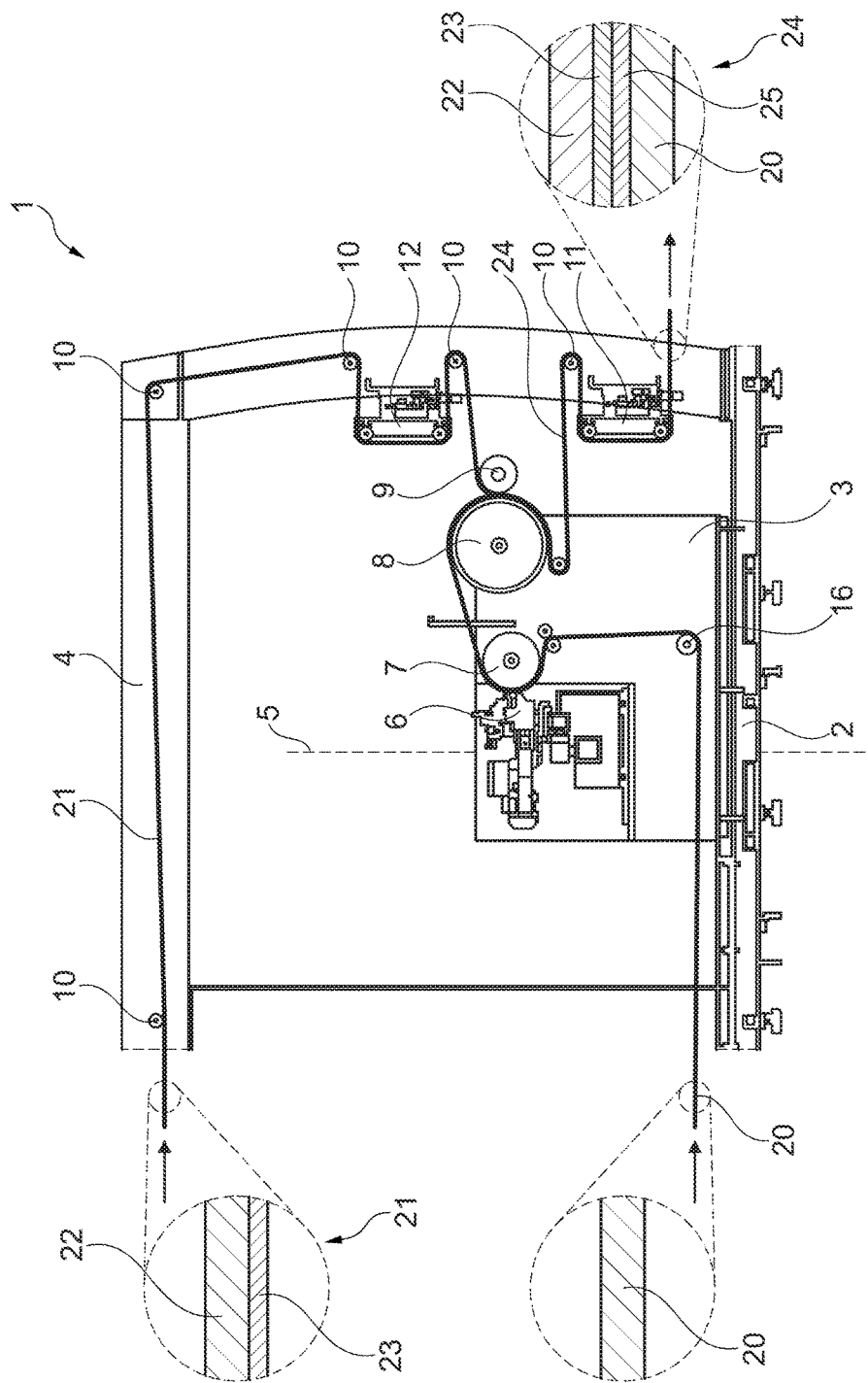
FIG. 2 shows the device of FIG. 1 with the hotmelt station in the second position.

FIG. 2 shows the device 1, wherein the hotmelt station 3 is rotated around the axis 5 over 180°. A web of label material 20 is fed to the device 1. The label material 20 is in this case not provided with additional coatings, but can be printed and could be a laminate on its own. Typically, the printed side of the web would be on the bottom side when fed to the device 1. However, the top side could also be provided with a print.

The web of label material 20 is transported horizontally towards the reversing roller 16 and then upwards into the first nip formed by the first back-up roller 7 and applicator 6, where the web of label material 20 is provided with a hotmelt coating. The web 20 is then transported further into the second nip formed by the second back-up roller 8 and pressure roller 9.

The rollers 10 on the portal frame 4 guide a web of liner material 21, which has a substrate 22 and a silicone layer 23 arranged at the bottom of the substrate 22. The web of liner material 21 passes the second web alignment 12 to ensure the correct alignment of the web of liner material 21 before it is fed to the second nip formed by the second back-up roller and the pressure roller 9, where the web of liner material 21 is merged with the web of hotmelt coated label material 20.

This laminate 24 of label material 20 and liner material 21 passes the first web alignment 11 and then exits the device 1 for further processing.

As is seen in the enlarged view, the laminate 24 is composed out of a layer of label material 20, a coating layer of hotmelt 25, a silicone layer 23 and a layer of liner substrate material 22, such that a lined label is provided.

Figure 3:
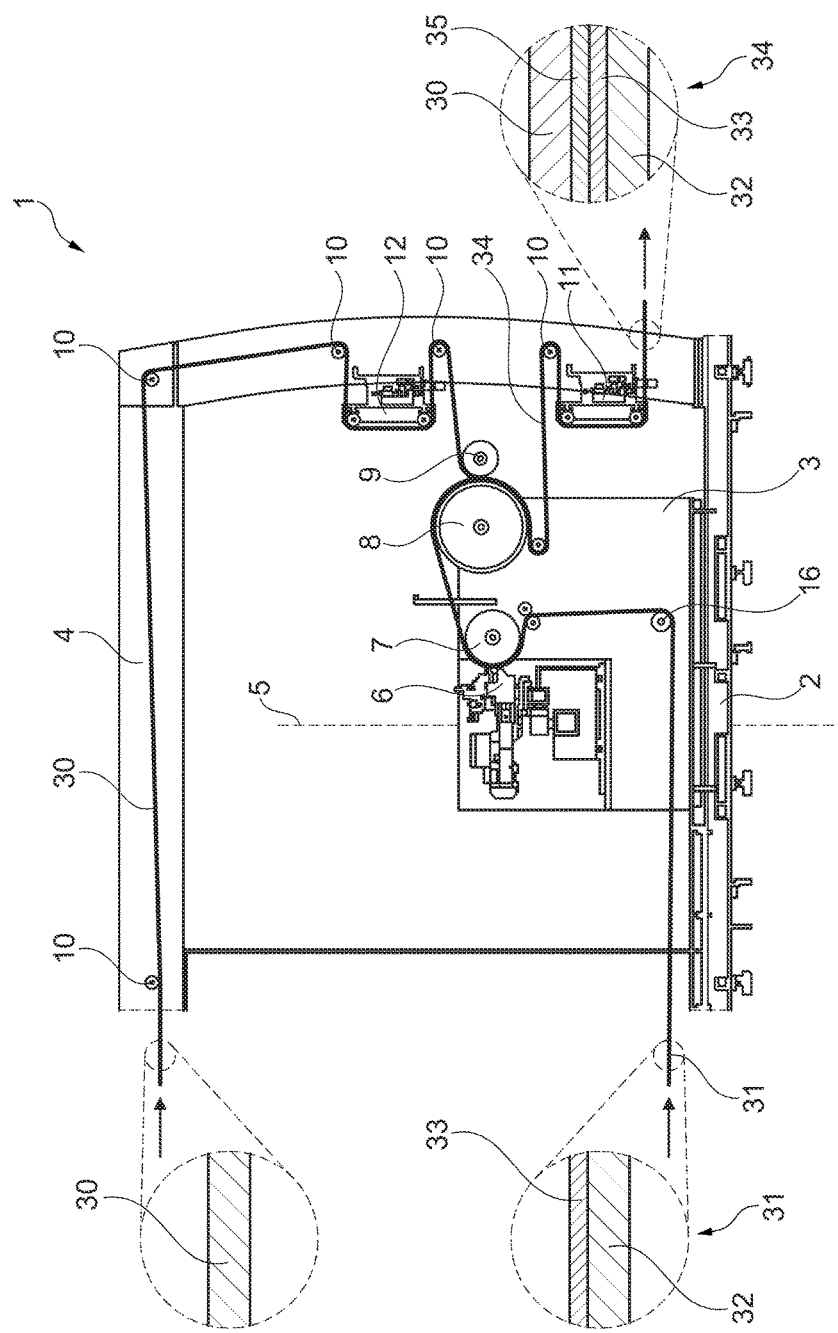
FIG. 3 shows an alternative use of the device 1 in the position as shown in FIG. 2.

FIG. 3 shows an alternative use of the device 1, wherein the hotmelt station 3 is rotated around the axis 5 over 180°, similar to FIG. 2.

In this case a web of label material 30 is fed to the device 1 at the top thereof. This is particularly preferred, if the label material 30 can only be fed to the device 1 with the top side provided with print, while the bottom side is to be provided with a hotmelt layer.

A web of liner material 31 having a substrate 32 and a release layer 33, such as a silicone layer, is fed at the bottom to the device 1. The web of liner material 31 is transported horizontally towards the reversing roller 16 and then upwards into the first nip formed by the first back-up roller 7 and applicator 6, where the web of label material 30 is provided with a hotmelt coating. The hotmelt coating is arranged on top of the release layer 33.

The web 30 is then transported further into the second nip formed by the second back-up roller 8 and pressure roller 9 and merged with the label material 30, such that the hotmelt coating is brought into direct contact with the label material 30.

This laminate 34 of label material 30 and liner material 31 passes the first web alignment 11 and then exits the device 1 for further processing.

As is seen in the enlarged view, the laminate 34 is composed out of a layer of label material 30, a coating layer of hotmelt 35, a release layer 33 and a layer of liner substrate material 32, such that a lined label is provided.

The invention claimed is:

1. A device for producing both linerless labels and lined labels comprising:
   a base frame;
   a hotmelt station arranged on the base frame, which hotmelt station comprises a first back-up roller, a hotmelt applicator directed towards the first back-up roller for applying a coating of hotmelt on a web of material guided over the first backup-roller and downstream of the hotmelt applicator, a second back-up roller and a pressure roller urged against the second back-up roller defining a first web path, wherein a second web path extends from near a bottom of the hotmelt station upwards through a first nip formed by the first back-up roller and the hotmelt applicator and over the second back-up roller and through a second nip formed by the second back-up roller and the pressure roller ending on a first side of the hotmelt station; and
   a portal frame arranged on the base frame and extending over the hotmelt station, wherein number of guide rollers are arranged on the portal frame for guiding a web of material along either of the first web path or the second web path, wherein both web paths extend at least over the hotmelt station;
   wherein the hotmelt station is rotatably arranged on the base frame around an axis parallel to a plane of either web path of the guide rollers between a first position and a reversed, second position, in which in both the first and second position the plane of either web path through the hotmelt station is parallel to the plane of either web path over the guide rollers on the portal frame.

2. The device according to claim 1, wherein in the first position of the hotmelt station, a single continuous web path is created by the web path of the hot melt station continued by the web path of the guide rollers and wherein in the reversed, second position the web path of the guide rollers ends into the second nip of hotmelt station, such that a web of material guided along the web path of the guide rollers is merged with a web of material guided along the web path of the hotmelt station.

3. The device according to claim 2, further comprising a first web alignment arranged on the portal frame and on an end of the web path of the guide rollers.

4. The device according to claim 2 and a web of label material, wherein the web of label material is on one side provided with a release layer, such as a silicone coating, wherein the hotmelt station is rotated into the first position and wherein the web of label material is transported from near the bottom of the hotmelt station upwards through the first nip and over the second back-up roller and through the second nip, wherein the release layer is in direct contact with both the first and second back-up rollers, and wherein the web of label material exits on the first side of the hotmelt station, continues along the web path of the portal frame, such that the web of label material is transported over the hotmelt station to the second side of the hotmelt station opposite from the first side.

5. The device according to claim 2, a web of label material, and a web of liner material which is on one side provided with a release layer, such as a silicone coating, wherein the hotmelt station is rotated into the second position and wherein the web of label material is transported from near the bottom of the hotmelt station upwards through the first nip and over the second back-up roller and through the second nip, wherein the web of label material exits on the first side of the hotmelt station, and wherein the web of liner material is transported via the web path of the portal frame from the second side of the hotmelt station, being opposite from the first side, to the first side of the hotmelt station, wherein the web of liner material is fed into the second nip of the hotmelt station, such that the web of liner material is merged with the web of label material and wherein the release layer of the web of liner material is in direct contact with the applied coating of hotmelt.

6. The device according to claim 2, a web of label material, and a web of liner material which is on one side provided with a release layer, such as a silicone coating, wherein the hotmelt station is rotated into the second position and wherein the web of liner material is transported from near the bottom of the hotmelt station upwards through the first nip, such that the release layer is coated with a hotmelt, and over the second back-up roller and through the second nip, wherein the web of liner material exits on the first side of the hotmelt station, and wherein the web of label material is transported via the web path of the portal frame from the second side of the hotmelt station, being opposite from the first side, to the first side of the hotmelt station, wherein the web of label material is fed into the second nip of hotmelt station, such that the web of label material is merged with the web of liner material and wherein the coating of hotmelt of the web of liner material is in direct contact with the web of label material.

7. The device according to claim 1, further comprising a first web alignment arranged on the portal frame and on an end of the web path of the guide rollers.

8. The device according to claim 7, further comprising a second web alignment arranged on the portal frame along the web path of the guide rollers and upstream of the first web alignment.

* * * * *